(12) United States Patent
Mehra

(10) Patent No.: US 8,856,440 B2
(45) Date of Patent: Oct. 7, 2014

(54) VOLATILE MEMORY REPRESENTATION OF NONVOLATILE STORAGE DEVICE SET

(75) Inventor: Karan Mehra, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 483 days.

(21) Appl. No.: 13/230,832

(22) Filed: Sep. 12, 2011

(65) Prior Publication Data

US 2013/0067159 A1 Mar. 14, 2013

(51) Int. Cl.
*G06F 12/02* (2006.01)
*G06F 3/06* (2006.01)

(52) U.S. Cl.
CPC ............ *G06F 3/0665* (2013.01); *G06F 3/0605* (2013.01); *G06F 3/0644* (2013.01); *G06F 3/0689* (2013.01)
USPC .......................................... 711/114; 711/170

(58) Field of Classification Search
CPC ....... G06F 12/02; G06F 12/0646; G06F 3/06; G06F 3/0629; G06F 3/0689; G06F 3/0665; G06F 3/0644
USPC .................................................. 711/114, 170
See application file for complete search history.

(56) References Cited

U.S. PATENT DOCUMENTS

| | | | |
|---|---|---|---|
| 6,643,654 B1 | 11/2003 | Patel et al. | |
| 7,467,276 B1 | 12/2008 | Kahn | |
| 7,574,560 B2 * | 8/2009 | MacHardy et al. | 711/114 |
| 7,711,897 B1 | 5/2010 | Chatterjee | |
| 7,930,475 B1 | 4/2011 | Kleiman et al. | |
| 7,945,726 B2 | 5/2011 | Faibish et al. | |
| 8,205,062 B2 * | 6/2012 | Rushworth et al. | 711/171 |
| 8,443,153 B1 * | 5/2013 | Edwards et al. | 711/147 |
| 8,478,962 B2 * | 7/2013 | Rushworth et al. | 711/171 |
| 8,555,022 B1 * | 10/2013 | Edwards et al. | 711/170 |
| 8,732,518 B2 * | 5/2014 | Storer et al. | 714/6.1 |
| 2006/0224844 A1 | 10/2006 | Kano | |
| 2009/0248763 A1 | 10/2009 | Rajan | |
| 2012/0266011 A1 * | 10/2012 | Storer et al. | 714/1 |
| 2013/0290648 A1 * | 10/2013 | Shao et al. | 711/154 |

FOREIGN PATENT DOCUMENTS

| | | |
|---|---|---|
| CN | 102929786 A | 2/2013 |
| WO | 2013039523 A1 | 3/2013 |

OTHER PUBLICATIONS

International Search Report cited in PCT Application No. PCT/US2011/055608 dated Sep. 26, 2012, 9 pgs.

(Continued)

*Primary Examiner* — Stephen Elmore
(74) *Attorney, Agent, or Firm* — John Jardine; Andrew Sanders; Micky Minhas

(57) ABSTRACT

The storage devices of a storage device set (e.g., a RAID array) may generate a nonvolatile representation of the configuration of the storage device set, including logical disks, spaces, storage pools, and layout and provisioning plans, on the physical media of the storage devices. A computer accessing the storage device set may also generate a volatile memory representation of the storage device set to use while accessing the storage devices; however, the nonvolatile representation may not be performant due to its different usage and characteristics. Presented herein are techniques for accessing the storage device set according to a volatile memory representation comprising a hierarchy of logical disks, slabs, and extents, and an accessor comprising a provisioning component that handles slab accesses while applying provisioning plans, and that interfaces with a lower-level layout component that translates slab accesses into storage device accesses while applying layout plans to the storage device set.

20 Claims, 5 Drawing Sheets

(56) References Cited

OTHER PUBLICATIONS

"A Storage Slab Allocator for Disk Storage Management in File System", Junwei Zhang, Jingliang Zhan, Jiangang Zhang, Xiaoming Han and Lu Xu, In: 2009 IEEE International Conference on Networking, Architecture and Storage, Digital Object Identifier: 10.1109/NAS.2009.57, 2009, pp. 295-302.

Edwards; et al., "FlexVol: Flexible, Efficient File Volume Virtualization in WAFL", Retrieved: May 3, 2011, pp. 1-23, http://www.usenix.org/event/usenix08/tech/full_papers/edwards/edwards_html/.

"Deploying Citrix XenServer 5.0 with Dell EqualLogic PS Series storage", Retrieved: May 4, 2011 http://www.citrix.com/site/resources/dynamic/partnerdocs/citrix-xenserver-equallogic_final.pdf.

"VMware View 4.5 on Cisco Unified Computing System and NetApp Storage Design Guide", Retrieved: May 4, 2011, pp. 1-124, http://www.cisco.com/en/US/docs/solutions/Enterprise/Data_Center/Virtualization/ucs_view_netapp.html.

"Hitachi Virtual Storage Platform", Retrieved: May 4, 2011, http://www.hds.com/assets/pdf/hitachi-architecture-guide-virtual-storage-platform.pdf.

"3PAR Thin Provisioning Eliminating Allocated but Unused Storage and Accelerating ROI", 2008, http://www.3par.com/SiteObjects/BB82FD784AC978CBC76B9DCD0446B8E8/3PAR-tp-wp-08.3.pdf.

\* cited by examiner

VOLATILE MEMORY REPRESENTATION OF NONVOLATILE STORAGE DEVICE SET

BACKGROUND

Within the field of computing, many scenarios involve the storage of data on a storage device set, such as a set of hard disk drives managed by a storage controller. The storage device set may be configured in many ways, e.g., with various addressing schemes, forms of capacity aggregation of the capacities of the storage devices, and resiliency and provisioning plans. For example, various storage pools may be generated, wherein a logical disk or logical volume is presented using the shared capacity of two or more storage devices or storage regions thereof.

The configuration of the storage device set is often stored on the physical media of one or more of the storage devices, e.g., as a set of representations of one or more storage devices, one or more storage pools, spaces manifested from the storage pools, and physical extents that are allocated from the physical storage regions of the storage devices and mapped to corresponding logical storage regions of the spaces. The persistence of the representation of the storage device set on the physical storage devices may enable storage services to recover from a failure (e.g., a power failure that erases the volatile memory of computer using the storage device set, or the reconstruction of the data of a failed storage device onto a substitute storage device through the use of a resilient storage plan).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A computer utilizing a storage device set may generate a volatile memory representation of the configuration of the storage device set in order to access the storage devices in a correct manner, and without having to refer frequently to the configuration information stored on the storage devices. In some scenarios, the computer may simply generate a volatile memory representation that is structurally identical to the configuration stored on the physical media, but this representation of the storage set may be inefficient for volatile memory use. For example, the representation persisted on the physical media of the storage devices may be selected in furtherance of the storage efficiency, concurrent accesses, and mirroring of the physical media representation on other storage devices. However, these characteristics of the physical media representation of the storage set configuration may not be particularly advantageous for a volatile memory representation, which may be frequently referenced in order to access the storage set. For example, while the physical memory representation may enable the identification of the physical location within an extent corresponding to a logical location of a space, this determination may not be highly performant, and may delay the responsiveness of the computer in accessing the storage device. Therefore, it may be advantageous to generate a different representation of the configuration of a storage device set that facilitates such determinations for active use by a computer.

Presented herein are techniques for generating a volatile memory representation of the configuration of a storage device set. In accordance with these techniques, the storage device set may be represented as a set of logical disks, where each logical disk comprises a set of slabs, each having a provisioned capacity and a layout plan. Respective slabs, in turn, comprise a number of extents that are identified as a physical allocation on a storage device. This model of the storage set may be represented in volatile memory, e.g., as a hierarchy or tree, and may enable rapid determination of the physical location of the extent storing the data for a particular logical location. Additionally, accesses to the storage set represented in this manner may be fulfilled by a system comprising a provisioning component that is configured to interface with the storage device set as a set of slabs, and a layout component that is configured to translate slab access requests into accesses of physical extents. The architecture of the access system in this manner may enable an efficient division of; e.g., the provisioning component may holistically manage the storage device set and may handle the details of provisioning plans (e.g., the fulfillment of allocation requests for a slab of capacity), while the layout component may implement the details of layout plans (e.g., for each slab allocation request, allocating extents on the physical storage devices that satisfy a resiliency plan, such as the striping of the storage of a slab across multiple storage devices, the mirroring of the capacities of a slab across To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
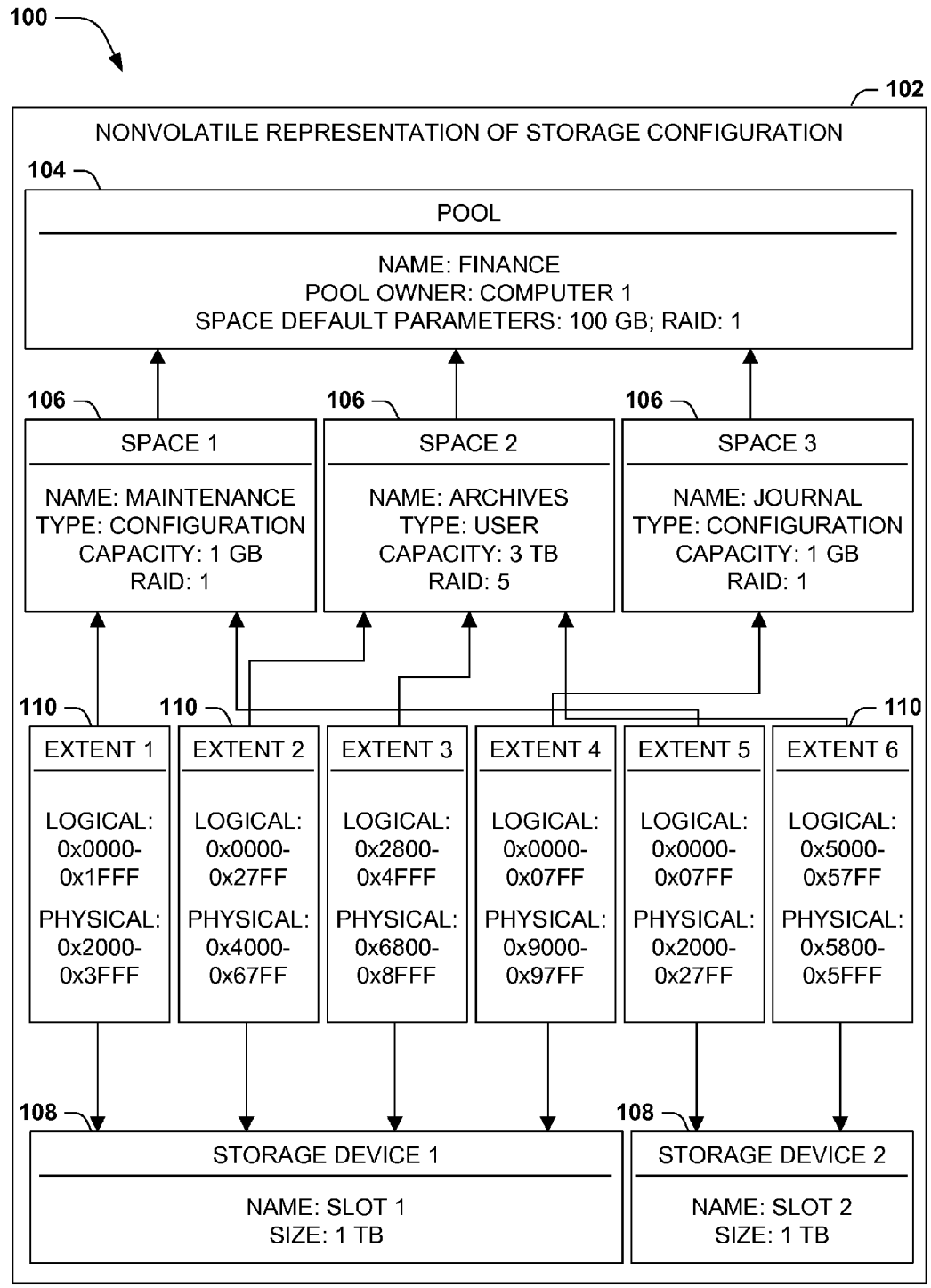
FIG. 1 is an illustration of an exemplary scenario featuring a nonvolatile memory representation of a storage device set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Background

Within the field of computing, many scenarios involve the accessing of nonvolatile storage devices of a storage device set. Such storage devices may comprise many types (e.g., hard disk drives; solid-state storage devices; and magnetic or optical discs), and may be utilized to store many types of data (e.g., files, email messages, database records, or media objects, or combinations thereof). The storage devices may be attached to a particular computer or device, or may be connected to and accessed through a network. The storage devices may also operate independently (e.g., without intercommunication or even mutual awareness of other storage devices of the storage device set); with loose collaboration (e.g., in communication and exchanging notifications of status); or with tight interoperation (e.g., a set of hard disk drives loaded into a storage controller, such as a Redundant Array of Inexpensive Disks (RAID) appliance). Also, the interoperation and/or use of the storage devices may result in logical or practical partitions between the data stored thereamong, or may result in an aggregation of data. For example, the available capacity of two or more storage devices may be aggregated into a storage pool that is presented to a computer as a single integrated volume.

The storage devices may also implement various layout plans, such as spanning (e.g., logically concatenating the capacity of the storage devices); striping (e.g., interleaving sequential logical addresses across the storage devices); mirroring (e.g., storing identical copies of a data set on respective storage devices of the storage device set, and maintaining the identity of the copies by automatically and concurrently applying changes to the data set to all of the copies); and parity calculations (e.g., when data is stored on one or more storage devices, a checksum of the stored data may automatically be calculated and stored on a different storage device, e.g., in order to enable recovery from a failure of a storage device). Additionally, the capacity of the storage devices may be provisioned according to various provisioning plans. As a first example, in a fixed provisioning plan, when a request to allocate a storage region is received, one or more storage devices may promptly allocate all of the capacity requested in the provisioning request, and may inform the requesting user or process that such capacity is available (and may optionally initialize the capacity with a default value). As a second example, in a delayed provisioning plan, when a request to allocate a storage region is received, the storage devices may indicate that the storage region is available for writing, but may not promptly allocate capacity for the storage region. Rather, the storage devices may await an access request to a location within the storage region, and upon receiving the access request, may promptly allocate physical storage (e.g., an extent) of a storage device and bind it to the logical address of the location. This "just-in-time" delayed provisioning may present some performance improvements (e.g., promptly fulfilling a request to generate the storage device, and/or a more efficient allocation of the available capacity of the storage device set than allocating capacity for a storage region that remains unused). As an additional variation, in a "thin" provisioning plan, the storage device set may authorize requests to allocate capacity that exceed the available capacity of the storage device set. Instead, the storage device set may allocate the capacity as used, and upon running low on available capacity, may notify an administrator to add storage devices that provide additional capacity. These and other types of layout and/or provisioning plans may be applied to the storage devices.

In order to represent the complex storage scenario involving multiple storage devices, storage pools, and layout and provisioning plans, the storage device set may store a physical, nonvolatile representation of the storage devices and the allocations thereamong. For example, a storage pool manager of a cluster may be appointed to handle requests to allocate storage regions and capacity on behalf of various processes, and may have exclusive write access to a storage region of one or more storage devices that is configured to store metadata describing the allocation and features of the storage pool. Moreover, the nonvolatile representation of the storage device set may be automatically synchronized among the storage devices in order to enable the availability of the metadata on any storage device; e.g., if any of the storage devices fails, the other storage devices may use the nonvolatile representations of the storage device set to determine the contents of the failed storage device and to reconstitute the data stored thereon.

FIG. 1 presents an illustration of an exemplary scenario 100 featuring a nonvolatile representation of a storage device set that may be stored on one or more storage devices. This nonvolatile representation may include records representing, e.g., each of the storage devices 108; one or more storage pools 104; the spaces 106 manifested from the storage pool 104, such as logical volumes, parity spaces, and journals; and the physical extents 110 allocated from the physical capacity of the storage devices 108 and bound to respective logical addresses of the respective spaces 106. This exemplary nonvolatile representation may be read by any computer or device seeking to access the storage device set in order to determine the allocations, provisions, and relationships implemented and exhibited by the storage devices of the storage device set.

Computers may also generate, in its volatile memory, a representation of the storage device set. For example, in order to access a particular logical location of the storage device set, a computer may endeavor to identify the physical location where the logical location is stored, and to comply with the provisioning plans and/or layout plans of the storage device set. In one such scenario, the computer may simply load the nonvolatile representation into volatile memory, and reference the nonvolatile representation in order to make such determinations. However, the differences in usage between the nonvolatile representation and the volatile, in-memory representation may present some disadvantages. For example, a nonvolatile representation may be generated to document the properties of the storage device set in an accurate and consistent manner, e.g., in a manner that many computers and storage devices may concurrently access and/or update. In particular, the nonvolatile representation stored on the storage devices may be infrequently accessed (e.g., may be read only occasionally by a computer or storage device), and may not be devised or optimized for performance. For example, in order to locate an extent 110 bound to a particular space 106, the computer may have to examine all of the spaces 106 and/or extents 110, because these structures may not be indexed or ordered in any particular manner. However, the computer may seek to utilize the volatile memory representation on a frequent basis, e.g., many times per second. The structure of the volatile memory representation may therefore affect the performance of the computer in accessing the storage devices, and a volatile memory representation that is not particularly configured for rapid access (e.g., the nonvolatile representation) may significantly impair the performance of the computer. Moreover, the computer may comprise plentiful volatile storage capacity, and may not expose its volatile memory to other computers; therefore, the configuration of the nonvolatile representation to reduce the size of the representation and to reduce concurrent access issues may not be applicable to the usage by the computer.

B. Presented Techniques

Presented herein are techniques for generating a representation of a storage device set that may be stored in a volatile memory of a device such as a computer, and that may facilitate accesses to the storage device set. In particular, structuring the representation in order to expedite the identification of physical locations of the storage devices that correspond to logical locations of interest may significantly impact the performance of the computer in accessing the storage device set.

Figure 2:
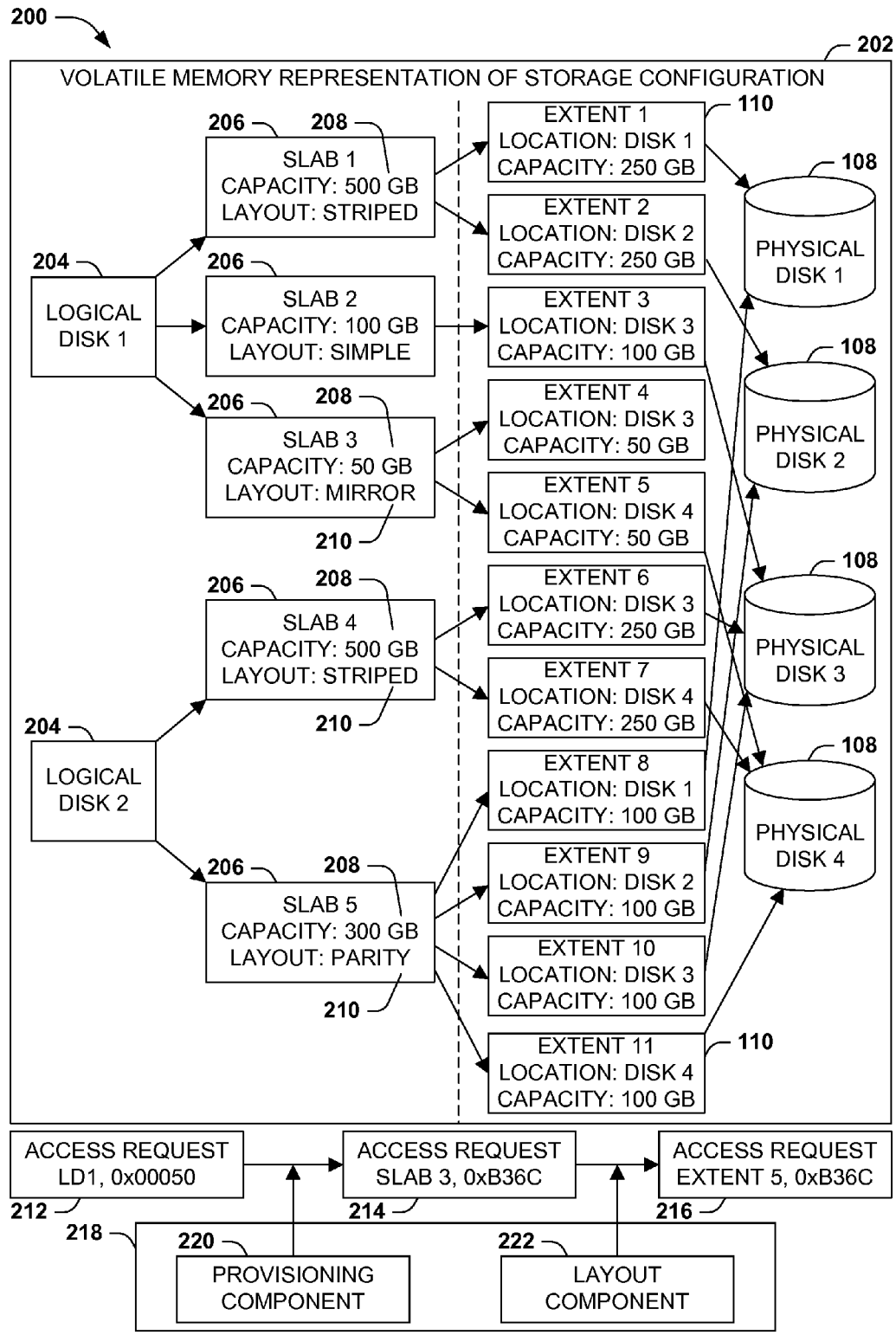
FIG. 2 is an illustration of an exemplary scenario featuring a volatile memory representation of a storage set according to the techniques presented herein.

FIG. 2 presents an illustration of an exemplary scenario 200 featuring an exemplary volatile memory representation of a storage device set that may be generated in the volatile memory of a computer or other device, and that may be rapidly utilized to access the logical capacity of the storage device set. In this exemplary scenario 200, the volatile memory representation 202 comprises a hierarchy, beginning with a set of logical disks 204 that are manifested on the computer. The logical disks 204 are associated with slabs 206, each comprising a logical block of storage capacity of a logical disk 204. The slabs 206 may have a provisioned size 208, and/or may indicate a layout plan 210 (e.g., a mirrored slab, a striped slab, or a parity slab). However, the details of the layout plan 210 are not exposed at the level of the slabs 206; e.g., a 100 gigabyte mirrored slab and a 100 gigabyte simple slab may be represented with the same provisioned capacity 208, and may each provide 100 gigabytes of provisioned capacity to a logical disk 204, even if the mirroring (if performed on two storage devices) may utilize 200 gigabytes of physical capacity. Rather, the details of the layout plan 210 are implemented at the lower level of the extents 110 that are allocated for and bound to respective slabs 206, and that are provisioned from the physical capacity of the storage devices 108.

This volatile memory representation 202 may be utilized to identify the physical location associated with a logical address in a performant manner. For example, the logical address may specify a logical disk 204. Using the particular logical address, a slab 206 may be identified that is bound to the logical address of the logical disk 204. Next, the logical location within the slab 206 may be used to identify the extent 110 that is bound to a logical address range comprising the logical address within the slab 206, which may translate to a physical address within the extent 110. Finally, the physical address within the extent 110 may be mapped to the physical location on a storage device 106, where the requested logical location may be found and accessed. In this manner, the hierarchical nature of the volatile memory representation 202 may be particularly suited for rapidly identifying the physical locations of the storage devices 108 that are mapped to the logical locations of the logical disks 204.

In addition, the hierarchical nature of the volatile memory representation 202 may enable the development of an accessor that flexibly handles the complexities of allocating capacity of the storage devices. In particular, a conceptual partition may be identified between the allocation of slabs 206 (according to a provisioning plan) and the allocation of extents 110 (according to the layout plan 210 of the slab 206). In particular, a request to access a location or allocate capacity may be conceptually handled by a provisioning component 220, which may holistically evaluate the logical storage capacity of the storage device set, and may apply provisioning concepts of the provisioning plans of the slabs 206. However, the access and allocation requests may be translated into physical access requests that may be handled by a layout component 222, which may enforce the layout plans 210 of the respective slabs. For example, a request to allocate a slab 206 with a promptly provisioned capacity of 100 gigabytes and a twofold mirroring layout plan may be handled, first, as a request to the provisioning component 220 to allocate a slab 206 with a promptly allocated capacity of 100 gigabytes, and, second, as a request to the layout component 222 to allocate capacity for the slab 206 in the form of two 100-gigabyte extents 110 on two different storage devices 108. Similarly, upon receiving a request to access a data set at a logical address of a logical volume 204, the provisioning component 220 may identify the slab 206 associated with the logical address of the logical volume, and may translate the access request into a slab access request to access the particular logical location of the slab 206. However, the layout component 222 may examine the slab 206 and may identify a striped layout plan 210 across three extents 110 stored on three storage devices 108. The layout component 222 may therefore generate three access requests to access the respective portions of the data set on the respective extents 110, and may de-stripe the read data into the original data set. In this manner, the provisioning component 220 and the layout component 222 may divide the access and allocation tasks into logical interactions with the logical disks 204 and slabs 206 involving provisioning plans and physical interactions with the extents 110 and storage devices 108 of the storage set according to the layout plan implemented by the slab 206.

C. Primary Embodiments

FIG. 2 presents an illustration of an exemplary scenario 200 featuring a first embodiment of these techniques, illustrated as an exemplary system 218 configured to allocate capacity for logical disks 204 on the storage devices 108 of a storage device set. The exemplary system 218 may be implemented, e.g., as a set of interoperating components, each comprising a set of instructions stored in a memory component of a computer (e.g., a memory circuit, a platter of a hard disk drive, a solid-state storage device, or a magnetic or optical disc) that, when executed by a processor of the computer, cause the computer to allocate capacity according to the techniques presented herein. The exemplary system 218 comprises a layout component 220, which is configured to, upon receiving a slab allocation request specifying a layout plan, allocate extents on the storage devices 108 that together satisfy the slab allocation request and the layout plan. The layout component 220 is further configured to, upon receiving a layout access request to access a slab, access the extents of the slab according to the layout plan. The exemplary system 218 also includes a provisioning component 222, which is configured to, upon receiving a capacity request to allocate capacity for a logical disk, generate at least one slab allocation request specifying a layout plan, and present respective logical disks as a sequence of slabs. The provisioning component 222 is further configured to, upon receiving an access request to access a location of the logical disk, identify at least one slab comprising the location of the access, and generate a layout access request to access the slab according to the access request. In this manner, the exemplary system 218 allocates capacity on the storage devices 108 of the storage device set in accordance with the techniques presented herein.

Figure 3:
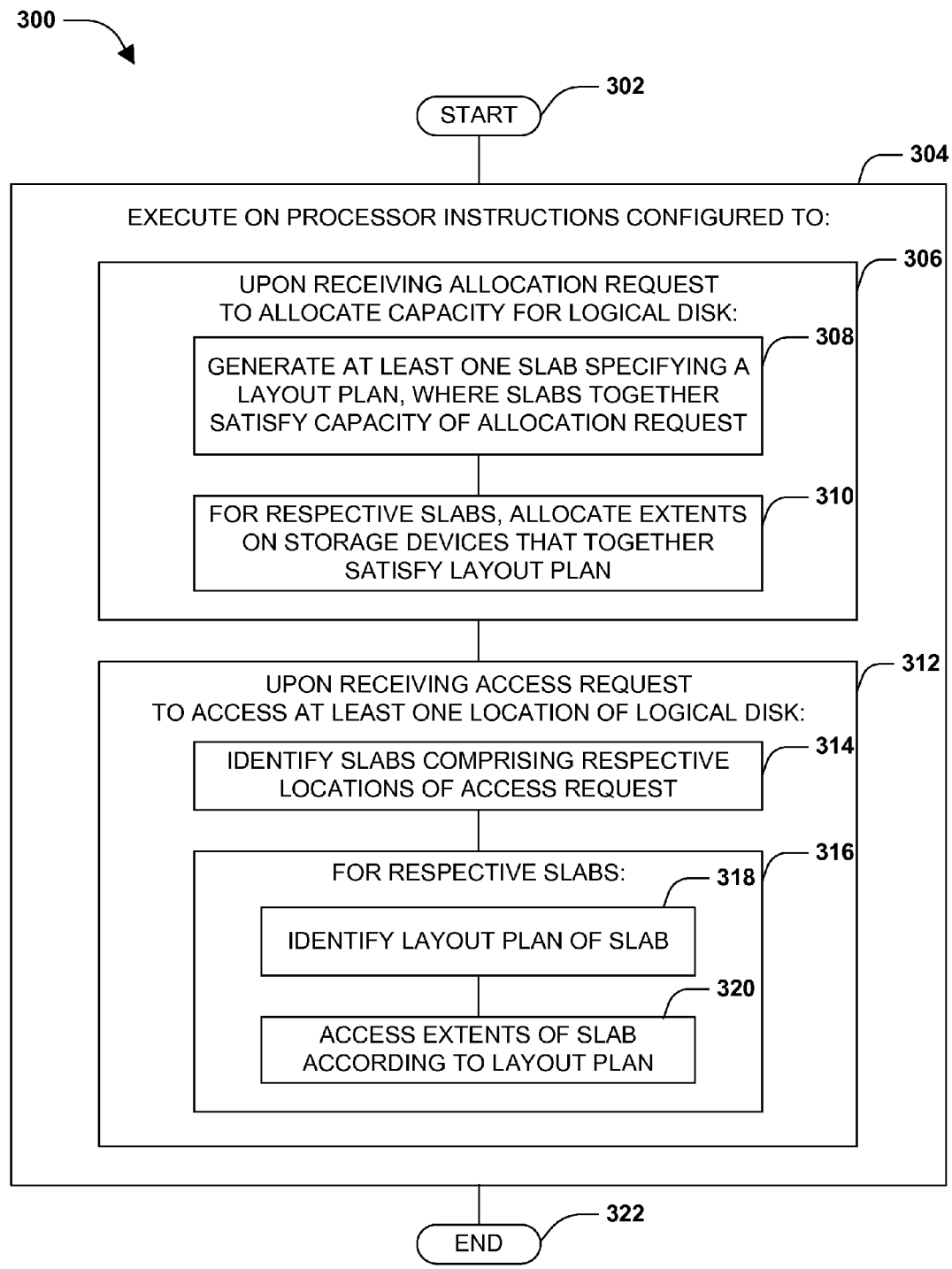
FIG. 3 is a flowchart illustrating an exemplary method of allocating capacity for logical disks on storage devices of a storage device set in accordance with the techniques presented herein.

FIG. 3 presents a second embodiment of the techniques presented herein, illustrated as an exemplary method 300 of allocating capacity for logical disks on a storage device set comprising at least one storage device 108. The exemplary method 300 may be implemented, e.g., as a set of instructions stored in a memory component of a computer (e.g., a memory circuit, a platter of a hard disk drive, a solid-state memory component, or a magnetic or optical disc) that, when executed by a processor of the computer, cause the computer to perform the techniques presented herein. The exemplary method 300 begins at 302 and involves executing 304 the instructions on the processor. Specifically, the instructions are configured to, upon receiving 306 an allocation request to allocate capacity for a logical disk, generate 308 at least one slab specifying a layout plan and that together satisfy the capacity of the allocation request, and for respective slabs, allocate 310 extents on the storage devices that together satisfy the layout plan. The instructions are also configured to, upon receiving 312 an access request to access at least one location of a logical disk, identify 314 at least one slab comprising respective locations of the layout access request, for respective 316 slabs, identify 318 the layout plan of the slab, and access 320 the extents of the slab according to the layout plan. Having achieved the allocation of capacity on the storage devices in accordance with the techniques presented herein, the exemplary method 300 ends at 322.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 4:
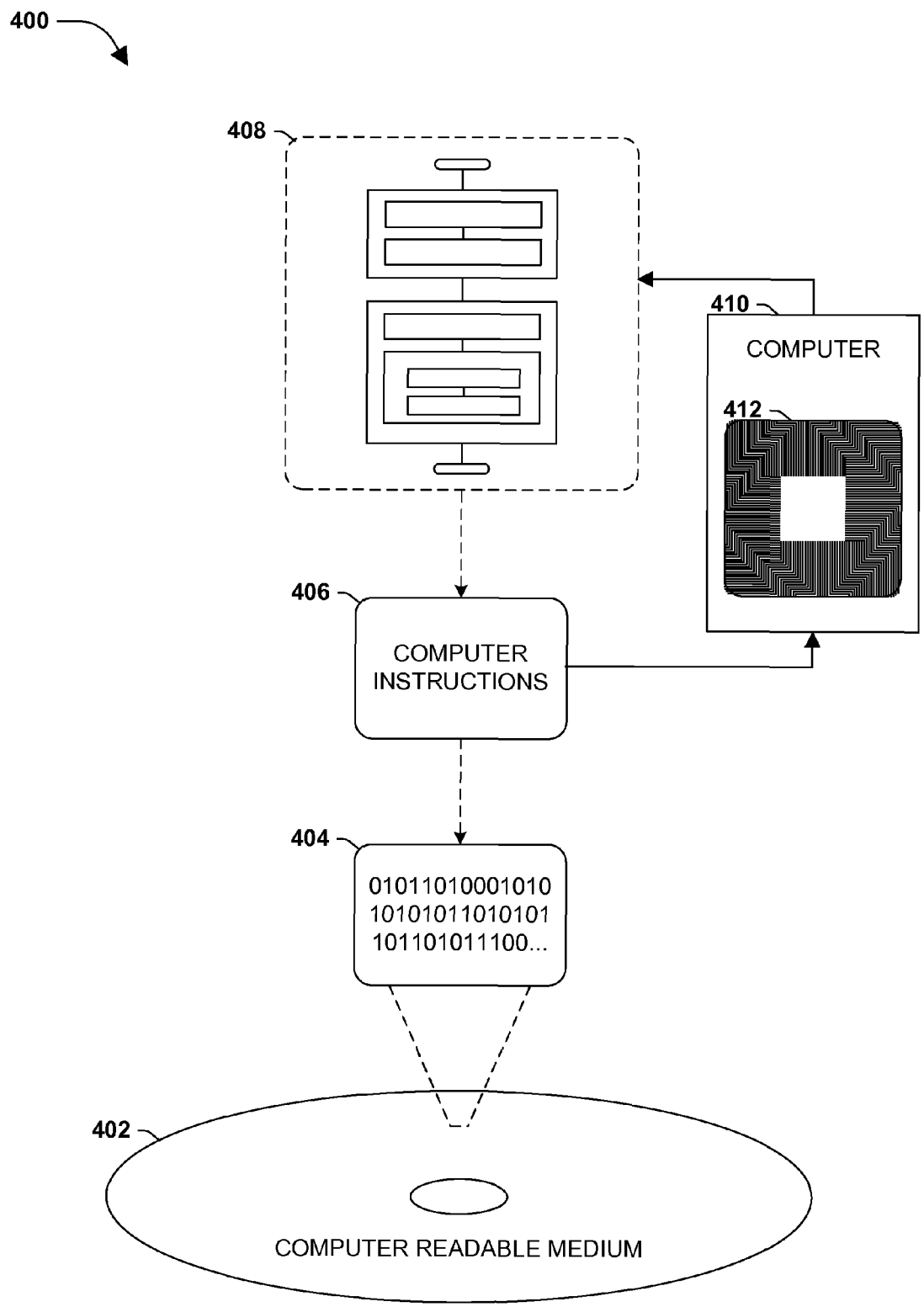
FIG. 4 is an illustration of an exemplary computer-readable medium comprising processor-executable instructions configured to embody one or more of the provisions set forth herein.

An exemplary computer-readable medium that may be devised in these ways is illustrated in FIG. 4, wherein the implementation 400 comprises a computer-readable medium 402 (e.g., a CD-R, DVD-R, or a platter of a hard disk drive), on which is encoded computer-readable data 404. This computer-readable data 404 in turn comprises a set of computer instructions 406 that, when executed on a processor 412 of a computer 410, cause the computer 410 to allocate storage on the storage devices 108 according to the principles set forth herein. In one such embodiment, the processor-executable instructions 406 may be configured to perform a method of allocating storage for logical disks on the storage devices of a storage device set, such as the exemplary method 300 of FIG. 3. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

D1. Scenarios

A first aspect that may vary among embodiments of these techniques relates to the scenarios wherein such techniques may be utilized. As a first variation of this first aspect, these techniques may be used with many types of storage devices, including hard disk drives, solid-state storage devices, nonvolatile memory circuits, tape-based storage devices, and magnetic and optical discs. Such storage devices may also be directly connected to a device (such as a computer) implementing these techniques; may be accessible through a wired or wireless local area network (e.g., an 802.11 WiFi network or ad-hoc connection, or an infrared connection); and/or may be accessible through a wired or wireless wide-area network (e.g., a cellular network or the internet). Moreover, these techniques may be used with two or more storage devices operating independently (e.g., storage devices that are accessed independently through a software process); operating with loose interoperation (e.g., storage devices that operate independently but that are informed of and may communicate with the other storage devices sharing the storage set); or operating with tight interoperation (e.g., a Redundant Array of Inexpensive Disks (RAID) controller managing several storage devices as components of a storage system).

As a second variation of this first aspect, these techniques may be used in conjunction with many types of storage sets comprising various types of data sets, including binary storage systems storing various types of binary objects; file systems storing files; media libraries storing media objects; object systems storing many types of objects; databases storing records; and email systems storing email messages.

As a third variation of this first aspect, portions or all of these techniques may be implemented within one or more components within the computing environment, such as a set of software instructions stored in a volatile or nonvolatile of a computer or device having access to the storage devices (e.g., an operating system process or a hardware driver); by a storage system configured to interface with the storage devices (e.g., a RAID controller); or in respective storage devices of the storage set.

As a fourth variation of this first aspect, the volatile memory representation generated and used by the techniques presented herein may present many structures. As one such example, and as depicted in the exemplary scenario 200 of FIG. 2, the volatile memory representation may be structured as a set of interrelated records or objects, such as a logical disk set comprising logical disks respectively represented as a sequence of slabs; a slab set comprising slabs respectively represented as a collection of extents; and an extent set comprising extents respectively represented as a storage device, a physical address, and an extent length. Moreover, this collection of interrelated records or objects may represent a particular organization, e.g., a hierarchical structure comprising a first hierarchical level representing the logical disks; a second hierarchical level representing the slabs; and a third hierarchical level representing the extents. Locations within a logical disk manifested by the storage device set may therefore be located by first identifying the slab comprising the location of the logical disk, and then identifying at least one extent within the slab comprising the location.

As a fifth variation of this first aspect, the accessing of the storage device set through the techniques presented herein may enable particular types of flexibility in the storage device set. As a first example, a first slab may be allocated for a logical disk specifying a first layout plan, and a second slab allocated for the logical disk specifying a second layout plan that is different from the first layout plan. As a second example, at least one capacity request received from an application specifying a slab usage, and the provisioning component configured to select a layout plan according to the slab usage of the slab. In particular, a first slab allocated for a logical disk having a first slab capacity, and a second slab allocated for the logical disk having a second slab capacity that is different from the first slab capacity.

As a sixth variation of this first aspect, many types of layout plans may be represented by the storage set. An exemplary layout plan set may include, e.g., a monolithic layout plan specifying an allocation of extents on one storage device; a striping layout plan specifying an allocation of extents on at least two storage devices that together provide the capacity of the slab allocation request; a mirroring layout plan specifying an allocation of extents that respectively provide the capacity of the slab allocation request and that are mirrored; and a verifying layout plan specifying an allocation of at least one data extent on at least one storage device that together provide the capacity of the slab allocation request, and at least one verifier extent on at least one other storage device that stores verifiers for the data extents. Those of ordinary skill in the art may devise many variations in the scenarios, organizations, and uses of the techniques presented herein.

D2. Provisioning Plans and Layout Plans

A second aspect that may vary among embodiments of these techniques relates to the representation and enforcement of respective provisioning plans and layout plans on the storage device sets represented herein. As a first example of this second aspect, respective logical disks may implement a provisioning plan, wherein allocating the extents on the storage devices may be achieved by, upon receiving the allocation request to allocate capacity for a logical disk, allocating extents according to the provisioning plan of the logical disk, and accessing the slabs of a logical disk may comprise accessing the extents of the slabs according to the provisioning plan of the logical disk. The provisioning plans may be selected from an exemplary provisioning plan set including, e.g., a fixed provisioning plan specifying a prompt allocation of slabs satisfying the capacity of the logical disk, and a delayed provisioning plan specifying an allocation of slabs for a logical disk while accessing the slabs in response to an access request. In particular, the delayed provisioning plan may involve, upon receiving an access request specifying a location of the logical disk, identifying a slab associated with the location of the access request; upon identifying the slab, accessing the slab according to the access request; and upon failing to identify a slab associated with the location of the access request, allocating a slab for the logical disk, and associating the slab with the location of the logical disk specified by the access request. Upon allocating a slab, the embodiment may initialize the contents of the extents with the default value, and may therefore satisfy all write requests by directly referencing the stored contents of the extent. Alternatively, the embodiment may defer the initialization of the extents of the slab, and upon receiving a read request for which a slab associated with the location of the read request cannot be identified (e.g., where a slab is not bound to the location because a write has not previously been performed), an embodiment of these techniques may return a default value (e.g., 0) in response to the read request. Additionally, delayed provisioning may enable storage scenarios featuring thin provisioning, where the provisioned sizes of the slabs exceed the available capacity of the storage device set. For example, the storage device set may include a logical disk having a provisioned capacity exceeding the available capacity of the storage device set. As another example of thin provisioning, respective logical disks having a provisioned capacity within the available capacity of the storage device set; but the total provisioned capacity of the logical disks exceeding the available capacity of the storage device set.

As a second example of this second aspect, the sizes of respective slabs and/or extents may be selected differently in different contexts. As a first such example, slabs may be allocated with a small capacity that satisfies the access request. Allocating slabs of small sizes may be advantageous, e.g., for expediting repair processes by limiting the capacities of the slabs that have to be repaired. Alternatively, for a slab allocated on a particular storage device according to a fixed provisioning plan, the slab size may be maximized, e.g., by allocating a reduced number of slabs of a large size. This variation may enable a reduction in the number of records represented in the nonvolatile representation of the storage device set, and may thereby improving the performance of accesses to the storage device set through the nonvolatile memory representation. In addition, the allocation of slabs and extents during a repair operation may be selected in view of various factors. As a first example, the layout component configured to, upon detecting a failure of a failed storage device, for respective extents of the failed storage device, identify the slab comprising the extent, and allocate a substitute extent for the slab; and for respective slabs comprising at least one substitute extent and having a resilient layout plan, initiate a repair of the slab including the substitute extent. Thus, the layout component may automatically initiate repair operations of extents based on the layout plans implemented thereby. As a second example, where the storage device set comprising at least three storage devices; the allocation of substitute extents may be distributing the substitute extents allocated from the failed storage device across other storage devices of the storage device set. This may reduce the overloading of a storage device having plentiful capacity with the allocation of many extents. Many such storage scenarios may be achieved through the organization of the storage devices 102 in accordance with the techniques presented herein.

E. Computing Environment

Figure 5:
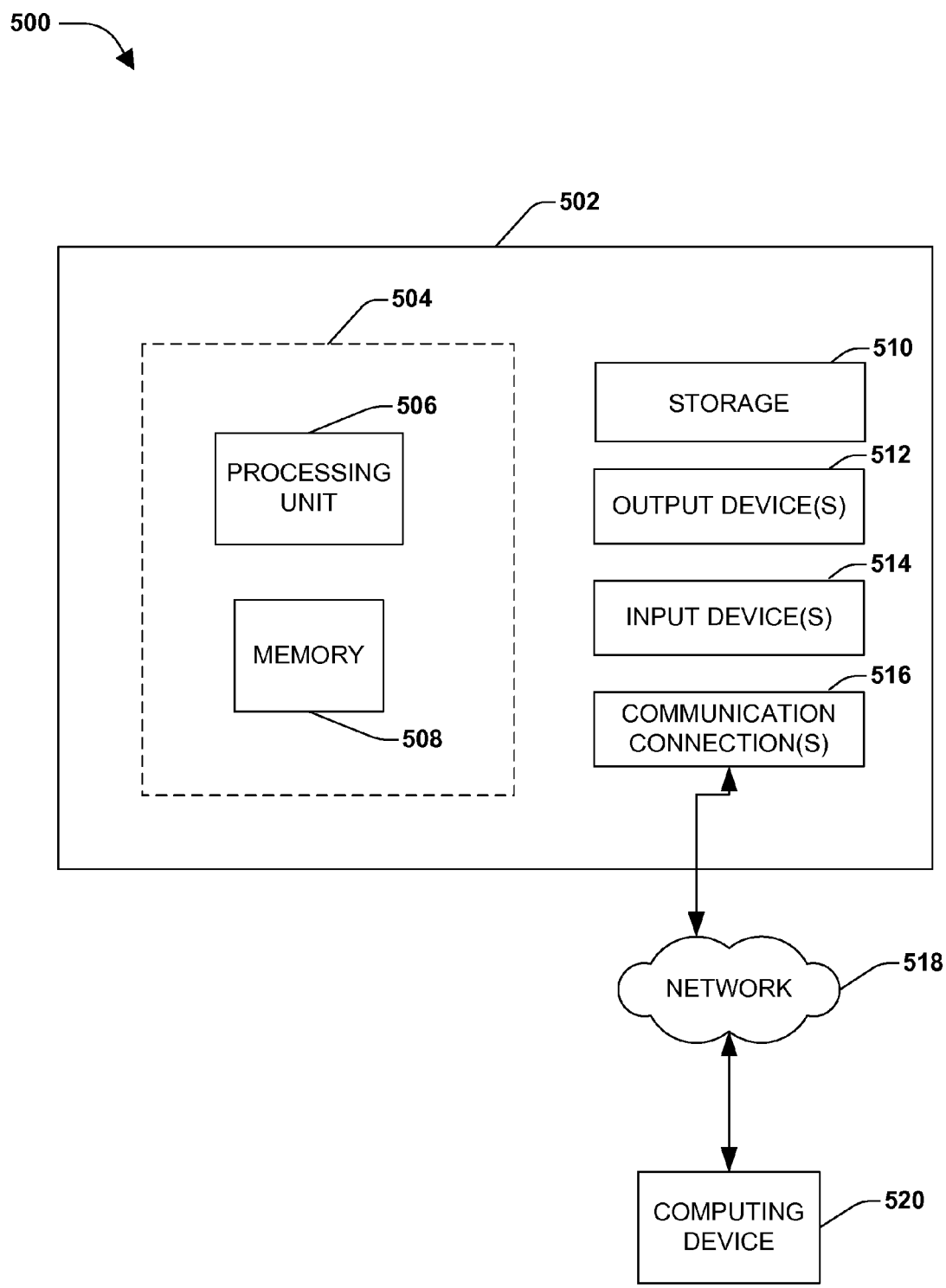
FIG. 5 illustrates an exemplary computing environment wherein one or more of the provisions set forth herein may be implemented.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

FIG. 5 illustrates an example of a system 500 comprising a computing device 502 configured to implement one or more embodiments provided herein. In one configuration, computing device 502 includes at least one processing unit 506 and memory 508. Depending on the exact configuration and type of computing device, memory 508 may be volatile (such as RAM, for example), non-volatile (such as ROM, flash memory, etc., for example) or some combination of the two. This configuration is illustrated in FIG. 5 by dashed line 504.

In other embodiments, device 502 may include additional features and/or functionality. For example, device 502 may also include additional storage (e.g., removable and/or non-removable) including, but not limited to, magnetic storage, optical storage, and the like. Such additional storage is illustrated in FIG. 5 by storage 510. In one embodiment, computer readable instructions to implement one or more embodiments provided herein may be in storage 510. Storage 510 may also store other computer readable instructions to implement an operating system, an application program, and the like. Computer readable instructions may be loaded in memory 508 for execution by processing unit 506, for example.

The term "computer readable media" as used herein includes computer storage media. Computer storage media includes volatile and nonvolatile, removable and non-removable media implemented in any method or technology for storage of information such as computer readable instructions or other data. Memory 508 and storage 510 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 502. Any such computer storage media may be part of device 502.

Device 502 may also include communication connection(s) 516 that allows device 502 to communicate with other devices. Communication connection(s) 516 may include, but is not limited to, a modem, a Network Interface Card (NIC), an integrated network interface, a radio frequency transmitter/receiver, an infrared port, a USB connection, or other interfaces for connecting computing device 502 to other computing devices. Communication connection(s) 516 may include a wired connection or a wireless connection. Communication connection(s) 516 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 502 may include input device(s) 514 such as keyboard, mouse, pen, voice input device, touch input device, infrared cameras, video input devices, and/or any other input device. Output device(s) 512 such as one or more displays, speakers, printers, and/or any other output device may also be included in device 502. Input device(s) 514 and output device(s) 512 may be connected to device 502 via a wired connection, wireless connection, or any combination thereof. In one embodiment, an input device or an output device from another computing device may be used as input device(s) 514 or output device(s) 512 for computing device 502.

Components of computing device 502 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 502 may be interconnected by a network. For example, memory 508 may be comprised of multiple physical memory units located in different physical locations interconnected by a network.

Those skilled in the art will realize that storage devices utilized to store computer readable instructions may be distributed across a network. For example, a computing device 520 accessible via network 518 may store computer readable instructions to implement one or more embodiments provided herein. Computing device 502 may access computing device 520 and download a part or all of the computer readable instructions for execution. Alternatively, computing device 502 may download pieces of the computer readable instructions, as needed, or some instructions may be executed at computing device 502 and some at computing device 520.

F. Usage of Terms

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of allocating, on a device having a processor, capacity for logical disks on a storage device set comprising at least one storage device, the method comprising:
    executing on the processor instructions configured to:
        upon receiving an allocation request to allocate capacity for a logical disk:
            generate at least one slab specifying a layout plan and that together satisfy the capacity of the allocation request, and
            for respective slabs, allocate extents on the storage devices that together satisfy the layout plan; and
        upon receiving an access request to access at least one location of a logical disk:
            identify at least one slab comprising respective locations of the layout access request; and
            for respective slabs:
                identify the layout plan of the slab; and
                access the extents of the slab according to the layout plan.

2. The method of claim 1, the storage device set represented as a storage device set representation comprising:
    a logical disk set comprising logical disks respectively represented as a sequence of slabs;
    a slab set comprising slabs respectively represented as a collection of extents; and
    an extent set comprising extents respectively represented as a storage device, a physical address, and an extent length.

3. The method of claim 2:
    the storage device set representation having a hierarchical structure comprising:
        a first hierarchical level representing the logical disks;
        a second hierarchical level representing the slabs; and
        a third hierarchical level representing the extents; and
    identifying a location within a logical disk comprising:
        identifying the slab comprising the location of the logical disk; and
        identifying at least one extent within the slab comprising the location.

4. The method of claim 1:
    a first slab allocated for a logical disk specifying a first layout plan; and
    a second slab allocated for the logical disk specifying a second layout plan that is different from the first layout plan.

5. The method of claim 4:
    at least one capacity request received from an application specifying a slab usage; and
    the provisioning component configured to select a layout plan according to the slab usage of the slab.

6. The method of claim 1:
    a first slab allocated for a logical disk having a first slab capacity; and
    a second slab allocated for the logical disk having a second slab capacity that is different from the first slab capacity.

7. The method of claim 1, the instructions configured to, upon allocating an extent, initialize the extent with a default value.

8. The method of claim 1:
    respective logical disks having a provisioning plan;
    allocating the extents on the storage devices comprising:
        upon receiving the allocation request to allocate capacity for a logical disk, allocate extents according to the provisioning plan of the logical disk; and
    accessing the slabs of a logical disk comprising: accessing the extents of the slabs according to the provisioning plan of the logical disk.

9. The method of claim 8, the provisioning plan selected according to a provisioning plan set comprising:
    a fixed provisioning plan specifying a prompt allocation of slabs satisfying the capacity of the logical disk; and
    a delayed provisioning plan specifying an allocation of slabs for a logical disk while accessing the slabs in response to an access request.

10. The method of claim 9, accessing the slabs for a logical disk according to a delayed provisioning plan comprising:
    upon receiving an access request specifying a location of the logical disk:
        identifying a slab associated with the location of the access request;
        upon identifying the slab, accessing the slab according to the access request; and
        upon failing to identify a slab associated with the location of the access request:
            allocating a slab for the logical disk, and
            associating the slab with the location of the logical disk specified by the access request.

11. The method of claim 10:
    the access request comprising a read request specifying a location of the logical disk; and
    the instructions configured to, upon failing to identify a slab associated with the location of the read request, return a default value in response to the read request.

12. The method of claim 10, allocating the slab comprising: allocating a slab with a small capacity that satisfies the access request.

13. The method of claim 10:
    the storage device set comprising an available capacity; and
    at least one logical disk having a provisioned capacity exceeding the available capacity of the storage device set.

14. The method of claim 10:
    the storage device set comprising an available capacity;

respective logical disks having a provisioned capacity within the available capacity of the storage device set; and a total provisioned capacity of the logical disks exceeding the available capacity of the storage device set.

15. The method of claim 10, the instructions configured to, upon receiving an allocation request to allocate capacity for a logical disk according to a fixed provisioning plan, allocate a reduced number of slabs that together satisfy the capacity of the logical disk.

16. A system for allocating capacity for logical disks on a storage device set comprising at least one storage device, the system comprising:
a layout component configured to:
upon receiving a slab allocation request specifying a layout plan, allocate extents on the storage devices that together satisfy the slab allocation request and the layout plan; and
upon receiving a layout access request to access a slab, access the extents of the slab according to the layout plan; and
a provisioning component configured to:
upon receiving a capacity request to allocate capacity for a logical disk, generate at least one slab allocation request specifying a layout plan;
present respective logical disks as a sequence of slabs; and
upon receiving an access request to access a location of the logical disk:
identify at least one slab comprising the location of the access, and
generate a layout access request to access the slab according to the access request.

17. The system of claim 16, the layout plan selected from a layout plan set comprising:
a monolithic layout plan specifying an allocation of extents on one storage device;
a striping layout plan specifying an allocation of extents on at least two storage devices that together provide the capacity of the slab allocation request;
a mirroring layout plan specifying an allocation of extents that respectively provide the capacity of the slab allocation request and that are mirrored; and
a verifying layout plan specifying an allocation of:
at least one data extent on at least one storage device that together provide the capacity of the slab allocation request; and
at least one verifier extent on at least one other storage device that stores verifiers for the data extents.

18. The system of claim 17, the layout component configured to, upon detecting a failure of a failed storage device:
for respective extents of the failed storage device:
identify the slab comprising the extent, and
allocate a substitute extent for the slab; and
for respective slabs comprising at least one substitute extent and having a resilient layout plan, initiate a repair of the slab including the substitute extent.

19. The system of claim 18:
the storage device set comprising at least three storage devices; and
allocating the substitute extents comprising: distributing the substitute extents allocated from the failed storage device across other storage devices of the storage device set.

20. A nonvolatile memory device storing instructions that, when executed on a processor of a storage manager, cause the storage manager to allocate capacity for logical disks on a storage device set comprising at least one storage device, by:
upon receiving an allocation request to allocate capacity for a logical disk:
generating at least one slab specifying a layout plan and that together satisfy the capacity of the allocation request, and
for respective slabs, allocating extents on the storage devices that together satisfy the layout plan; and
upon receiving an access request to access at least one location of a logical disk:
identifying at least one slab comprising respective locations of the layout access request; and
for respective slabs:
identifying the layout plan of the slab; and
accessing the extents of the slab according to the layout plan.

* * * * *